(12) United States Patent
Shaw

(10) Patent No.: US 7,058,970 B2
(45) Date of Patent: Jun. 6, 2006

(54) ON CONNECT SECURITY SCAN AND DELIVERY BY A NETWORK SECURITY AUTHORITY

(75) Inventor: Jeff A. Shaw, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 10/085,147

(22) Filed: Feb. 27, 2002

(65) Prior Publication Data

US 2003/0163728 A1   Aug. 28, 2003

(51) Int. Cl.
*H04L 9/00* (2006.01)
(52) U.S. Cl. .......................... 726/6; 709/225; 713/164; 713/182
(58) Field of Classification Search ............... 709/225; 713/164, 182, 201; 726/6
See application file for complete search history.

(56) References Cited

U.S. PATENT DOCUMENTS

2001/0034847 A1*  10/2001  Gaul, Jr. ..................... 713/201
2003/0055962 A1*   3/2003  Freund et al. .............. 709/225

OTHER PUBLICATIONS

Strebe et al., "Firewalls: 24seven," Sybex, first edition, 2000, pp. 25-26.*

* cited by examiner

*Primary Examiner*—David Jung
*Assistant Examiner*—Jacob Lipman
(74) *Attorney, Agent, or Firm*—Sharmini N. Green

(57) ABSTRACT

A network security authority system provides on-connect scan and delivery in a virtual lobby to enforce security requirements for a network.

22 Claims, 12 Drawing Sheets

ON CONNECT SECURITY SCAN AND DELIVERY BY A NETWORK SECURITY AUTHORITY

BACKGROUND

After Sep. 11, 2001, security is a greater concern for all of us. This includes cyber terrorism. The protection of information assets is a concern to private businesses, public organizations, and individual households. Nearly everyday we hear or read about hackers and computer viruses with weird names like the W.32 Donut virus, the Code Red virus, and the "I love you" virus. The tentacles of cyberspace reach into our homes and offices leaving us vulnerable to intruders and exposing weaknesses.

In today's interconnected world, an enterprise's private network is often not as private as it once was. Business-to-business relationships and employee connectivity often require connections to an enterprises' intranet through uncontrolled networks. How can a security administrator be confident that these communication lines are not used for unauthorized access to company resources? Often there are many points of access to an enterprise's private network. Employees work from home or on the road. Customers need access to data. Vendors access data or update systems. Each one of these points of access is a potential security hole that unauthorized users can exploit. There is a need to increase control over these access points and minimize the risks involved.

A major risk facing most enterprises is the lack of consistent configuration, deployment, and usage across the enterprise. This problem is compounded by the difficulty of determining the faults and non-compliance of specific users. Suppose an enterprise sends a memo to all its users telling them that they need to install a patch to avoid a known risk. The problem with this is that some people are not even going to get the memo or read it and others will try to install the patch but then not configure it properly. There is no way to ensure the patch is installed. There is a need for a way to uniformly enforce security requirements.

DETAILED DESCRIPTION

Method and system embodiments for on-connect security scan and delivery by a network security authority are described. In the following detailed description, reference is made to the accompanying drawings, which are part of this application. These drawings illustrate specific embodiments for practicing the present invention and reference numbers refer to substantially similar components throughout the drawings. The embodiments are described in sufficient detail to enable those skilled in the art to practice the present invention. Other embodiments may be used and structural, logical, electrical, and other changes may be made without departing from the scope of the present invention.

Figure 1:
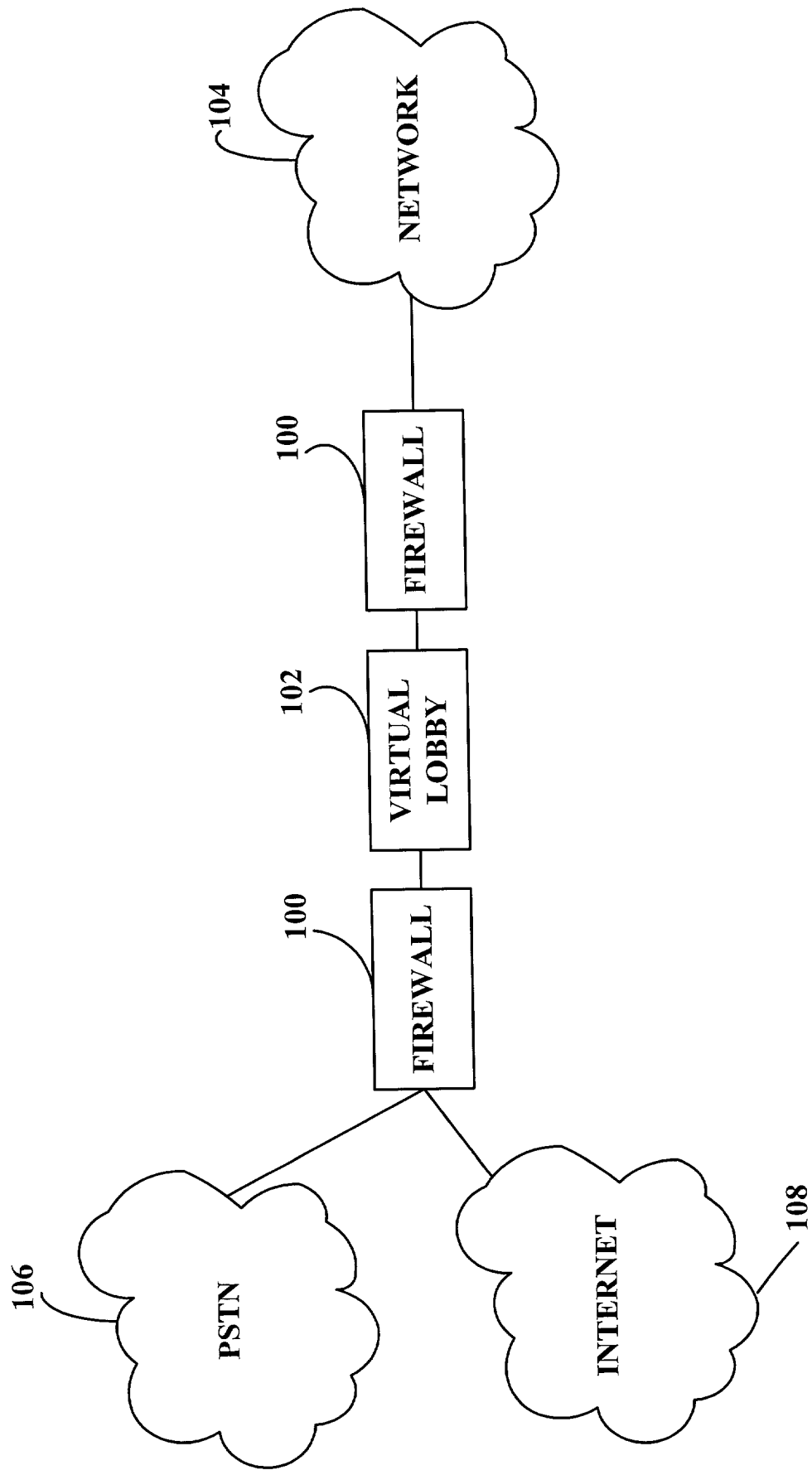
FIG. 1 is a block diagram of an example application for embodiments of the present invention.

FIG. 1 is a block diagram of an example application for embodiments of the present invention. One embodiment of a network security authority comprises two firewalls 100 around a virtual lobby 102. Consider a physical lobby in a building. It has doors locked during certain hours, a guard checking badges, briefcases, and packages, and other physical security. Like the physical lobby protects the building, the virtual lobby 102 protects a network 104 from potentially insecure connections. The virtual lobby 102 comprises at least one computing system and one or more software components capable of causing the computing system(s) to operate to protect the network 104. The virtual lobby 102 protects the network 104 from many threats, such as a client that has picked up a worm while surfing the Internet or a client that does not know it has a virus with the potential to spread it to the network 104. The virtual lobby 102 ensures that any client that connects into the network 104 has certain types of protection, such as proper virus protection software in order to avoid risks like spreading viruses.

Like the guard in the physical lobby protects the building by keeping out suspicious visitors, the virtual lobby 102 protects the network 104 by preventing potentially insecure clients from connecting to the network 104. In the virtual lobby 102, clients that lack the security mechanisms they need to comply with security requirements are given access to resources to be configured correctly so they can move past the virtual lobby 102 and get into the network 104. The virtual lobby 102 ensures that all the clients that are using the network 104 are in compliance with the latest security requirements, i.e. they have the latest virus patches, operating system patches, software firewalls, network intrusion detection software (NIDS), etc. Thus, the virtual lobby 102 has the power to enforce security policies. As used in this application, security requirements comprise one or more requirements or policies.

In FIG. 1, the virtual lobby 102 has a firewall on each side. One firewall 100 protects the virtual lobby 102 from the outside world and another firewall 100 protects the network 104 from clients in the virtual lobby 102. A firewall 100 is a set of related programs, usually located at a network gateway server that protects the resources of an enterprise's network from users from other networks. For example, an enterprise with an intranet allows its users to access the Internet, but installs a firewall 100 to prevent outsiders from accessing the enterprise's private resources and to control what outside resources are available to its users. Basically, a firewall 100, working closely with a router program examines each network packet to determine whether to forward it towards its destination. A firewall 100 also includes or works with a proxy server that makes network requests on behalf of users. A firewall 100 is often installed in a specially designated computer separate from the rest of the network.

There are many possible applications of the virtual lobby 102. One application is protecting the network 104 from connections by dialup or modem connections via the public switched telephone network (PSTN) 106. Other applications are protecting the network 104 from connections via the Internet 108, dedicated connections such as digital subscriber line (DSL), virtual private networks (VPNs), remote access systems and the like.

Figure 2:
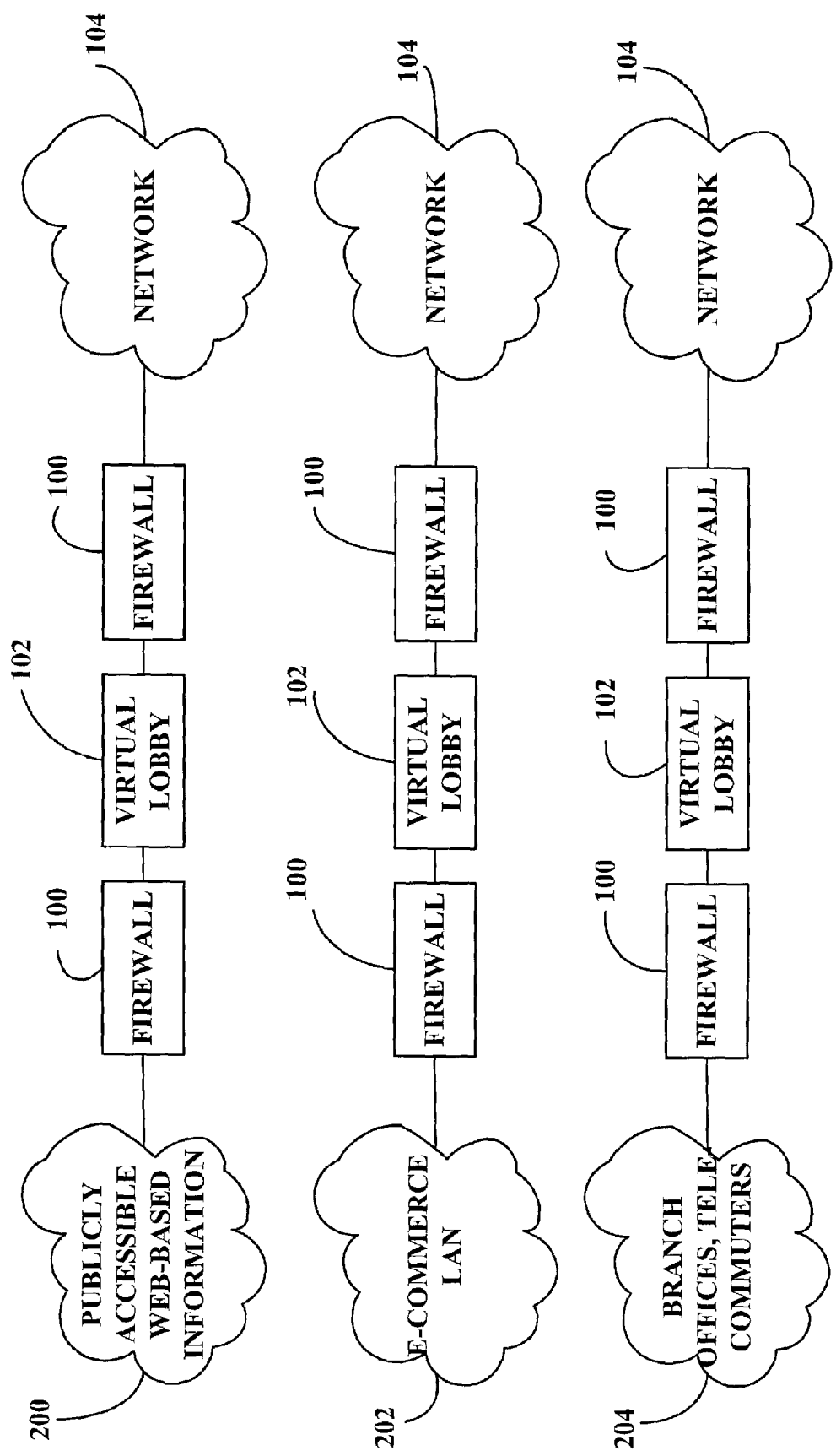
FIG. 2 is a block diagram of example applications in addition to those in FIG. 1 for embodiments of the present invention.

FIG. 2 is a block diagram of example applications in addition to those in FIG. 1 for embodiments of the present invention. As shown in FIG. 2, the virtual lobby 102 protects a network 104 from connections from publicly accessible web-based information 200, an e-commerce LAN 202, branch offices and telecommuters 204.

Figure 3:
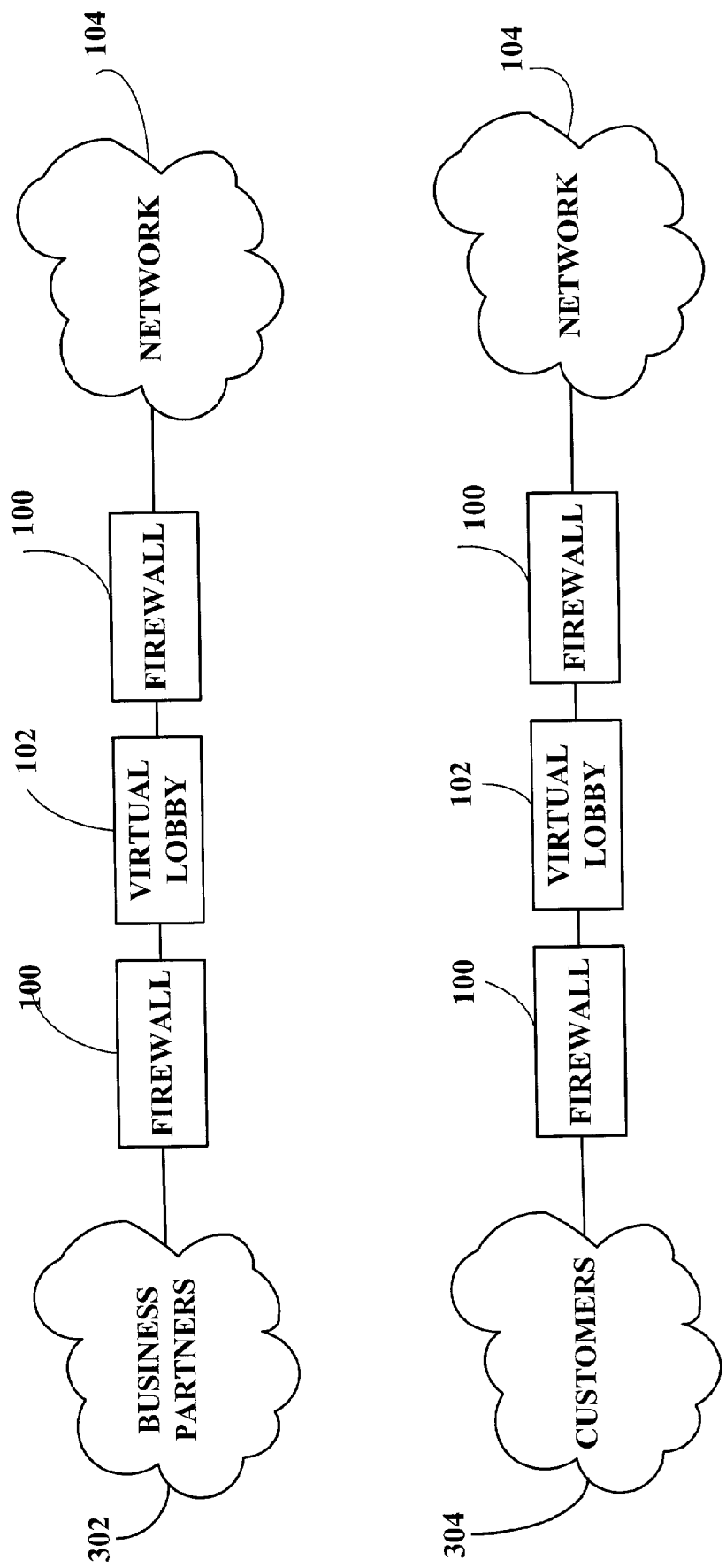
FIG. 3 is a block diagram of example applications in addition to those in FIGS. 1 and 2 for embodiments of the present invention.

FIG. 3 is a block diagram of example applications in addition to those in FIGS. 1 and 2 for embodiments of the present invention. As shown in FIG. 3, the virtual lobby 102 protects a network 104 from connections from business partners 302 and customers 304. FIGS. 1, 2, and 3 illustrate some example applications of the virtual lobby concept, but many other applications of the virtual lobby 102 will be apparent to those skilled in the art.

Figure 4:
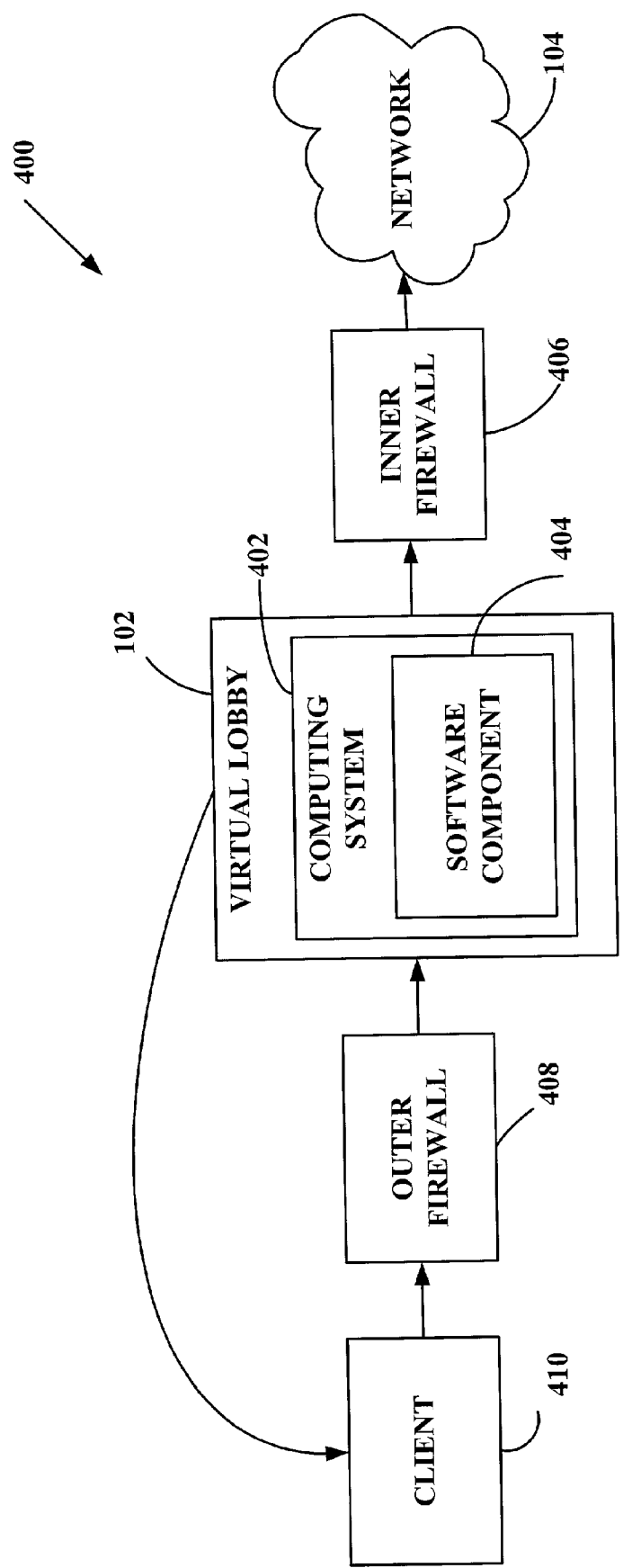
FIG. 4 is a block diagram of an embodiment of the present invention as a network security authority.

FIG. 4 is a block diagram of an embodiment of the present invention as a network security authority. An embodiment of the present invention is a network security authority system 400 comprising a computing system 402 and a software component 404 operable on the computing system 402. The computing system 402 is in a virtual lobby 102 between an inner firewall 406 that protects a network 104 and an outer firewall 408 that protects the virtual lobby 102. The software component 404 operates to prevent an insecure connection between a client 410 and the network 104 by scanning the client 410 to determine if the client 410 complies with security requirements.

In another embodiment, if scanning reveals non-compliance, the software component 404 provides at least one security mechanism to the client 410 so that the client 410 complies with the security requirements before permitting the client 410 to connect to the network 104.

In another embodiment, the network security authority system 400 further comprises a remote access infrastructure (not illustrated) to interface with the software component 404. In another embodiment, the remote access infrastructure processes at least dialup and virtual private network (VPN) connections.

Another embodiment of the present invention is a network security authority system 400 comprising a network 104, an inner firewall 406, a virtual lobby 102, an outer firewall 408, a computing system 402, and a software component 404. The inner firewall 406 prevents unauthorized access to the network 104. The virtual lobby 102 determines if a client 410 complies with security requirements. The outer firewall 408 prevents unauthorized access to the virtual lobby 102. The computing system 402 is in communication with the virtual lobby 102 and the software component 404 operable on the computing system 402 in the virtual lobby 102 determines if the client 410 complies with the security requirements. The computing system 402 also provides delivery of any security mechanisms required for the client 410 to comply with the security requirements, before allowing the client 410 access to the network 104 inside the inner firewall 406.

Figure 5:
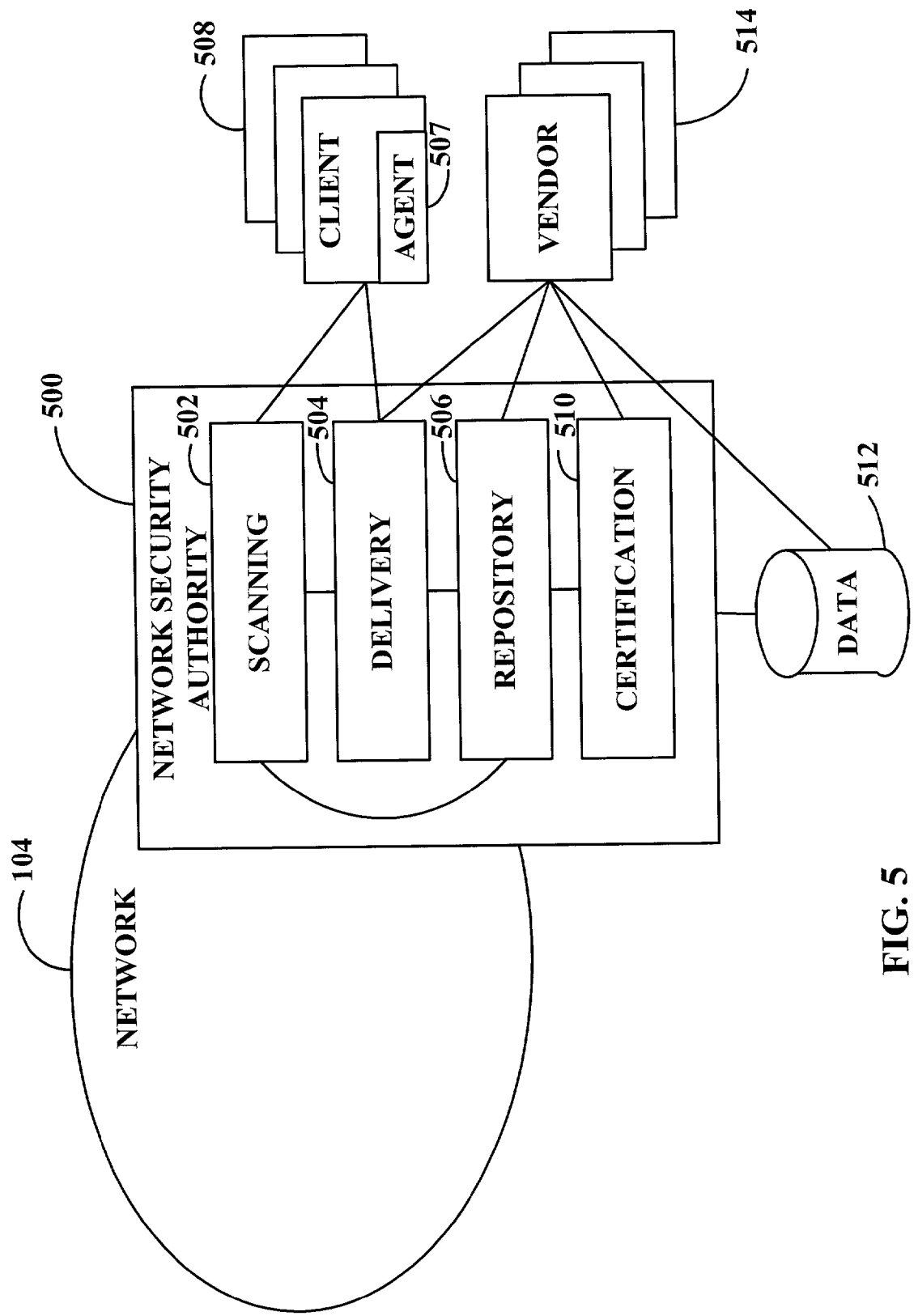
FIG. 5 is a block diagram of an alternate embodiment to FIG. 4 of the present invention as a network security authority.

FIG. 5 is a block diagram of an alternate embodiment to FIG. 4 of the present invention as a network security authority 500. As illustrated, a software component comprises three components operable on the computing system: a scanning component 502, a delivery component 504, and a repository component 506. The scanning component 502 scans a client 508 for security mechanisms complying with the security requirements, when the client 508 attempts to connect to the computing system. The delivery component 504 provides deliveries to the client 508 to comply with the security configuration. The repository component 506 is operable on the computing system and has repository tools accessible by the scanning component 502 and the delivery component 504. The repository component 506 holds the security requirements and delivery information.

In another embodiment, the repository component 506 also holds security policy information. In another embodiment, the repository component 506 comprises a policy management system.

In another embodiment, a virtual lobby in a demilitarized zone (DMZ) comprises a number of servers configured to perform a number of operations. A DMZ is a computer host or small network inserted as a "neutral zone" between an enterprise's private network and the outside public network. It prevents outside users from getting direct access to a server. (The term originates from the geographic buffer zone that was set up between North Korea and South Korea following the war in the early 1950s.) A DMZ is an optional and more secure approach to a firewall and effectively acts as a proxy server as well. One server operates to scan a client 508 to check compliance with security requirements. Another server operates to provide security mechanisms to clients 508 that need them to comply with the security requirements. The embodiment farther comprises facilities for remote access, such as VPN connections. The components of the embodiment are configured such that a client 508 connecting to the virtual lobby has access to security mechanisms it needs to comply with security requirements and other limited resources. In one embodiment, two firewalls are inside the DMZ and surround the virtual lobby. In another embodiment, two firewalls are outside the DMZ and surround the virtual lobby.

In another embodiment, an agent 507 is put on a client attempting to connect to the network 104. The agent 507 scans the client 508 to determine if the client 508 complies with the security requirements. In another embodiment, the agent 507 scans at a time when the client 508 is not attempting to connect to the network 104. The agent 507 maintains the client 508 in a coded way and when the client 508 attempts to connect, the latest scan is communicated to the virtual lobby. In one embodiment, the agent 507 maintains scan information in a footprint stored on the client 508. In another embodiment, the virtual lobby 102 determines if a client 508 complies with security requirements by interfacing with at least one Windows™ Management Instrumentation (WMI) component or at least one application programming interface (API) component on the client 508. In another embodiment, a registry on a personal computer (PC) is scanned to determine whether or not certain security products are installed. In another embodiment, other configuration details are checked, such as whether a particular security mechanism is running or if it is configured in compliance with security requirements.

In another embodiment, a network security authority system 500 comprises a virtual lobby computing system, a scanning component 502, and a delivery component 504. The virtual lobby computing system is in communication with two firewalls to protect a network from insecure clients attempting to connect to the network. The scanning component 502 is operable on the computing system to determine if a client 508 complies with security requirements and to determine if lacking security mechanisms are available for delivery. The delivery component 504 is operable on the computing system to deliver available security mechanisms to the client 508.

In another embodiment, the network security authority system 500 further comprises a repository component 506. The repository component 506 is in communication with the virtual lobby computing system to store the security requirements. In another embodiment, the repository component 506 is a database management system. In another embodiment, the repository component 506 operates to manage the security requirements and associated delivery instructions for available security mechanisms.

In another embodiment, the network security authority system 500 further comprises a certification system 510. The certification system 510 is in communication with the virtual lobby computing system to certify third-party security mechanisms that meet the security requirements. In another embodiment, a user interface is driven by security policies or security requirements. Security policies and requirements are derived from a security risk assessment and analysis. For example, a system administrator enters a new policy into the repository or updates an existing policy and the user interface provides editing and version control functions. Also, the user interface associates scanning information with delivery information or provides delivery features as part of scanning information. In another embodiment, the network security authority 500 is in communication with a data store 512, which is any type of memory device. In another embodiment, vendors 514 supply security mechanisms and related information to the delivery component 504, the repository component 506 and the certification system 510.

Figure 6:
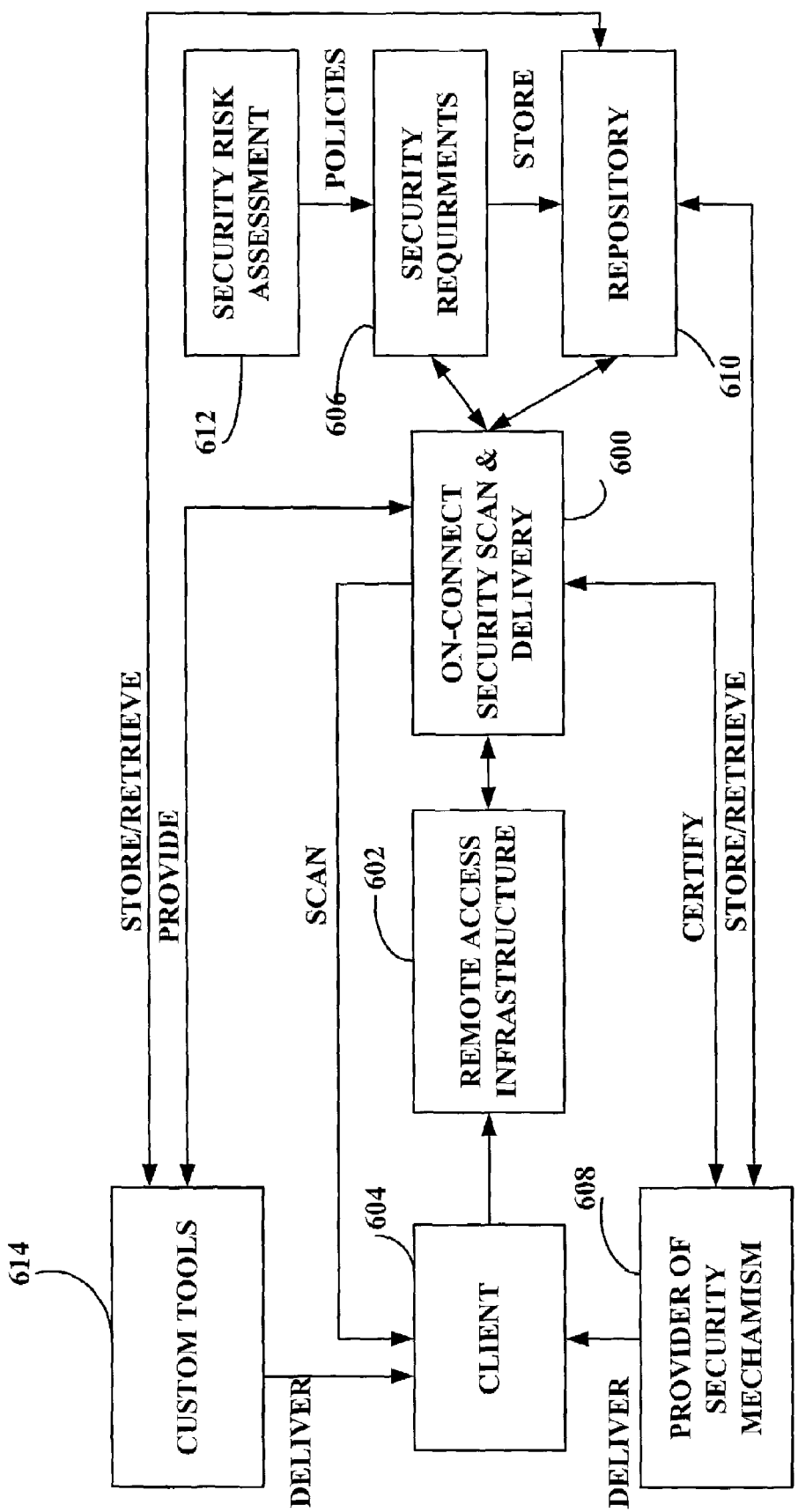
FIG. 6 is a block diagram of an embodiment of the present invention as a method for on-connect security scan and delivery.

FIG. 6 is a block diagram of an embodiment of the present invention as a method for on-connect security scan and delivery. An on-connect security scan and delivery method comprises interfacing with a remote access infrastructure 602 to detain a client 604 in a virtual lobby when the client 604 attempts to connect to a network. The client 604 is scanned to determine if the client complies with security requirements 606. Connection is permitted to the network only if the client 604 complies with the security requirements 606.

In another embodiment, the method further comprises interfacing with at least one provider 608 of at least one security mechanism to bring the client 604 into compliance with the security requirements 606, if the client 604 is not in compliance. For example, delivery of one security mechanism is provided by a website of a vendor and patches are located on storage mediums on the network. Example embodiments redirect the client 604 to the website, verify installation status, and then install the patches. Then, a rescan reveals the client meets the security requirements and is provided access to the network. Other example embodiments, do not rescan. In another embodiment, client information is retrieved from a repository 610.

In another embodiment, a security risk assessment 612 is performed for the network and then security requirements 606 are created to address the risks identified in the security risk assessment 612. A security risk assessment 612 determines the security status of the network and its associated information technology infrastructure. The security risk assessment 612 helps security administrators determine what is at risk and what the acceptable levels of risk are. The security risk assessment helps to shape security policies, procedures, and requirements 606. A typical security risk assessment 612 addresses areas such as security policy, security organization, asset control and classification, personnel security, physical and environmental security, communications and operations management, access control, system development and maintenance, business continuity management, and compliance. For more information, see International Standards Organization (ISO) 17799, Information technology, Code of practice for information security management, 2001.

In another embodiment, the security requirements 606 are stored in a repository 610. In another embodiment, the security requirements 606 are updated with a new policy and there is an interface with at least one provider to provide delivery of at least one security mechanism to at least partly implement the new policy. For example, security requirements 606 are updated or adjusted from time to time, week to week, day to day, in real-time, or whenever new risks or threats emerge and tools to fight them become available. In another embodiment, the at least one provider is certified. In another embodiment, the new policy is stored in a repository 610. In another embodiment, a custom configuration tool 614 is provided to at least partly implement the new policy.

Figure 7:
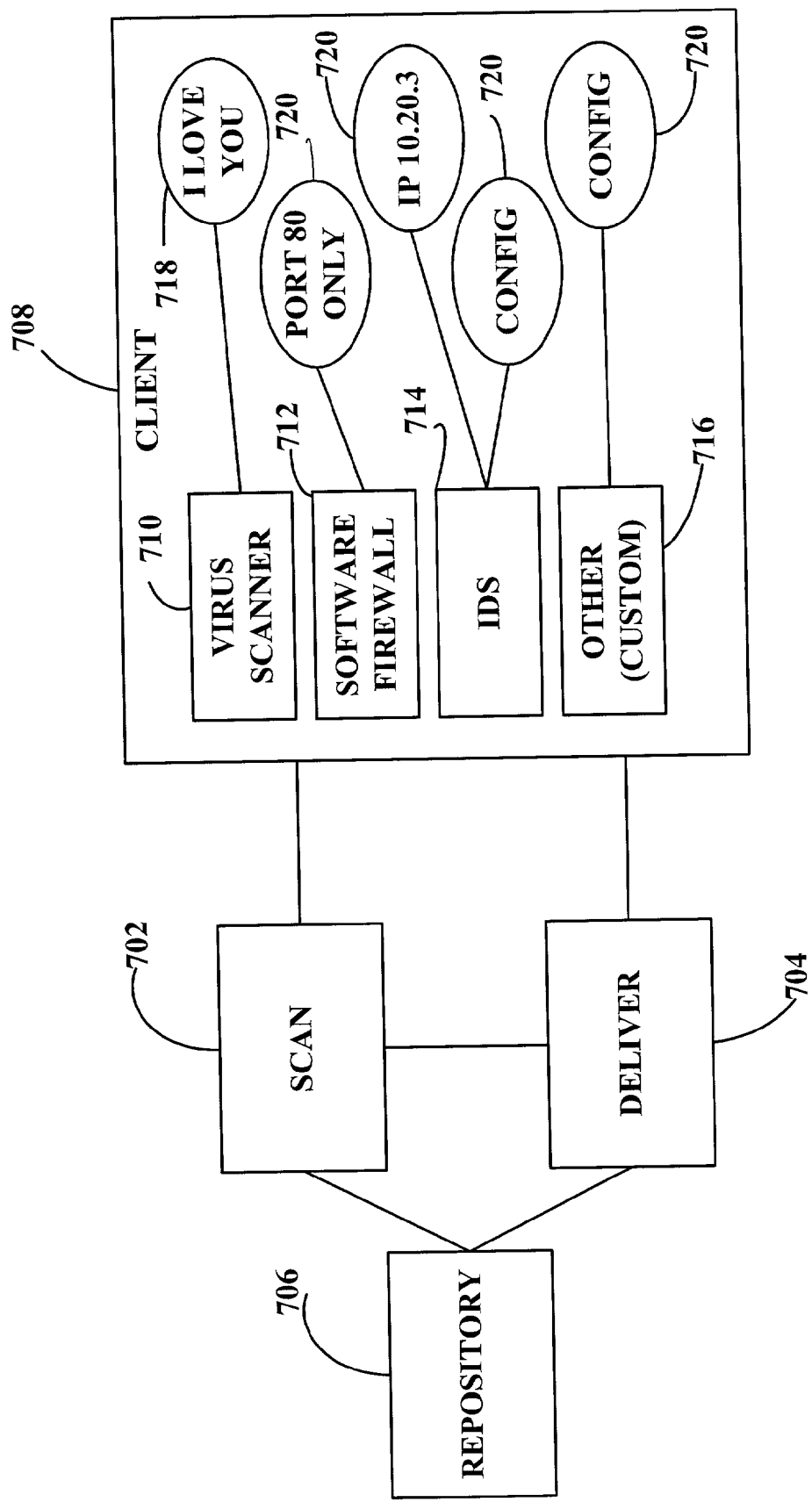
FIG. 7 is a block diagram of an alternate embodiment to FIG. 6 of the present invention as a method for on-connect security scan and delivery.

FIG. 7 is a block diagram of an alternate embodiment to FIG. 6 of the present invention as a method for on-connect security scan and delivery. The network security authority comprises a scanning component 702, a delivery component 704 and a repository component 706. The network security authority operates to scan the client 708 and deliver any security mechanisms needed by the client 708 to comply with security requirements. FIG. 7 shows some example security mechanisms and configurations. In this case, the client has a virus scanner 710, a software firewall 712, and intruder detection system (IDS) 714, and other custom security mechanisms 716. The virus scanner is configured to check for the particular virus "I love you" 718 and other configurations 720 are also shown in FIG. 7 on the client 708.

Figure 8:
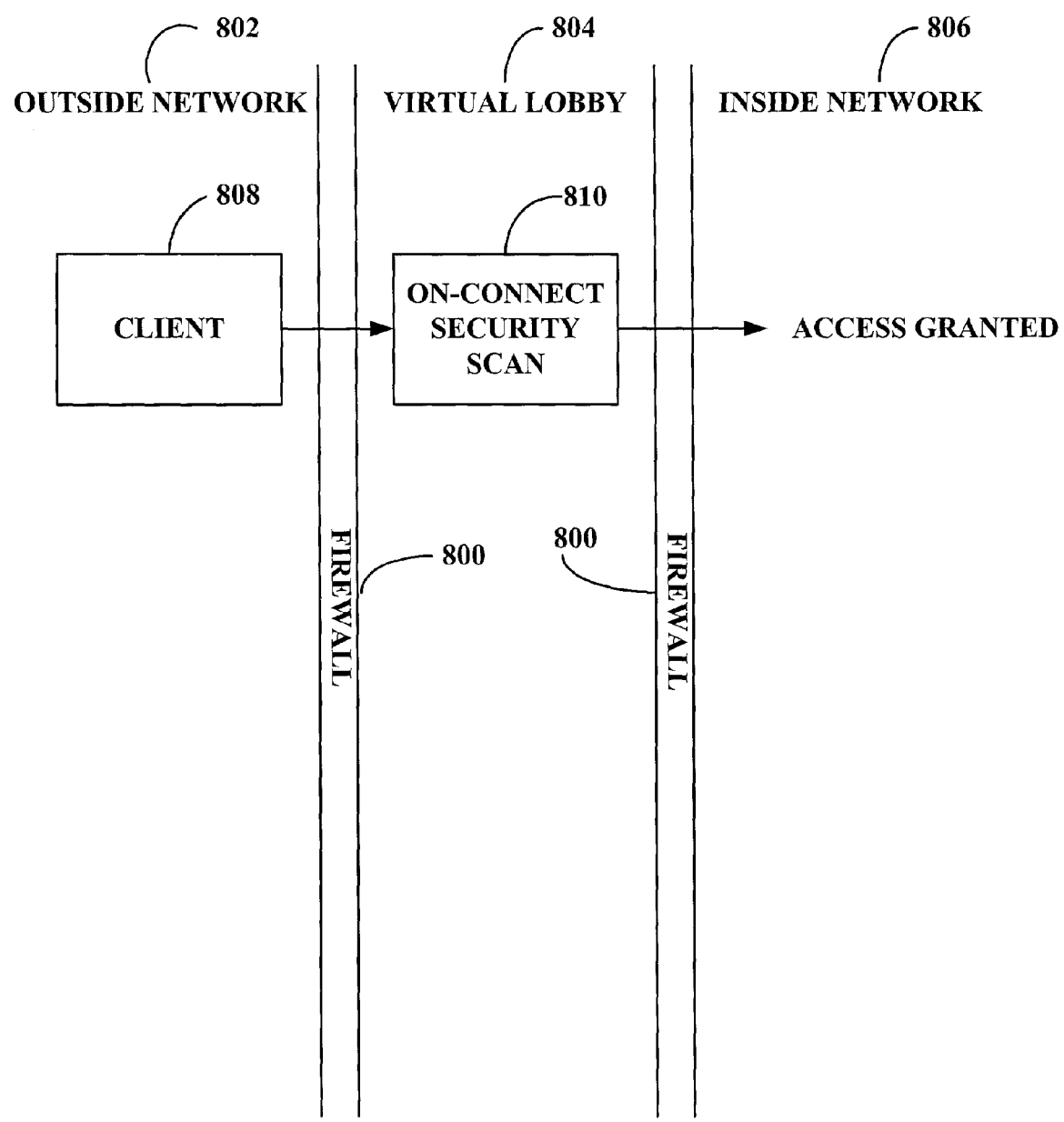
FIG. 8 is a block diagram of a general use case of embodiments of the present invention as a method for on-connect security scan and delivery.

FIG. 8 is a block diagram of a general use case of embodiments of the present invention as a method for on-connect security scan and delivery. In FIG. 8, the two firewalls 800 divide the diagram into three sections, outside the network 802 on the left, the virtual lobby 804 in the center, and inside the network 806 on the right. The client 808 starts outside the network and communicates with the on-connect security scan system 810. Then, the client's login is approved inside the virtual lobby. So, the client 808 does not get into the network at all if they do not have the correct user identification and password to login. If the client 808 is scanned and meets all the security requirements, then access is granted and the client 808 proceeds inside the network 806.

Figure 9:
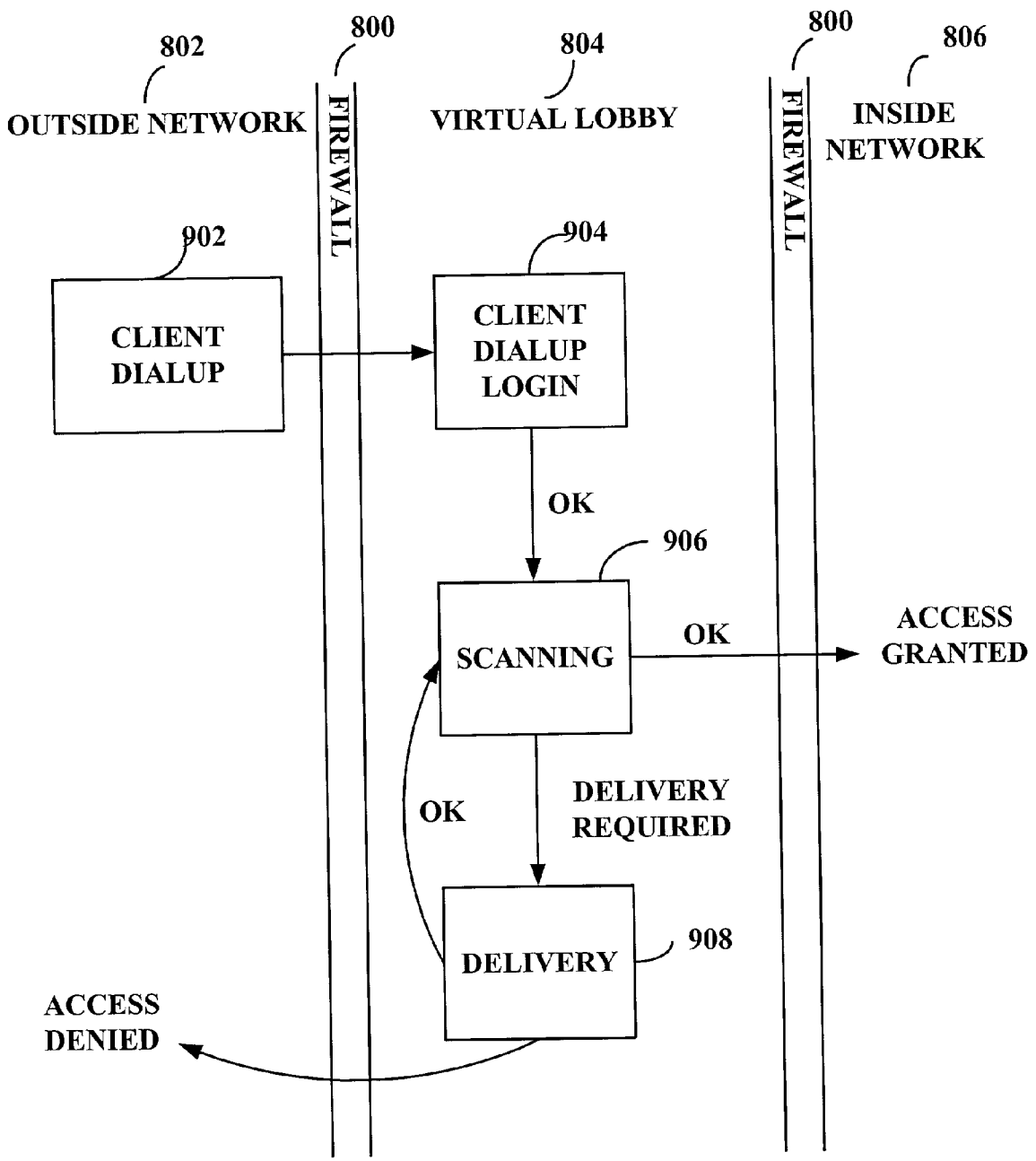
FIG. 9 is a block diagram of an alternate use case to FIG. 8 of embodiments of the present invention as a method for on-connect security scan and delivery.

FIG. 9 is a block diagram of an alternate use case to FIG. 8 of embodiments of the present invention as a method for on-connect security scan and delivery. In FIG. 9, a client starts again outside the network 802 and initiates a dialup connection 902 into the virtual lobby 804. If the login 904 is successful, then a scanning component 906 and a delivery component 908 come into play in the virtual lobby 804. In some embodiments, scanning includes checking a registry on the client to verify that certain files are installed in certain directories, the date of the files, and other checks. In some embodiments, custom software components are executed to check certain security mechanisms on the client. In some embodiments, scanning includes looking at the services that are running on the client to check if certain services are running and looking at configuration information, such as .INI files. In some embodiments, confidential information from vendors is incorporated into the scanning component 906 and certain privileges are granted to the scanning component 906 in order to perform certain checks. In other embodiments, the scanning component 906 integrates various scanning components 906 from vendors.

Figure 10:
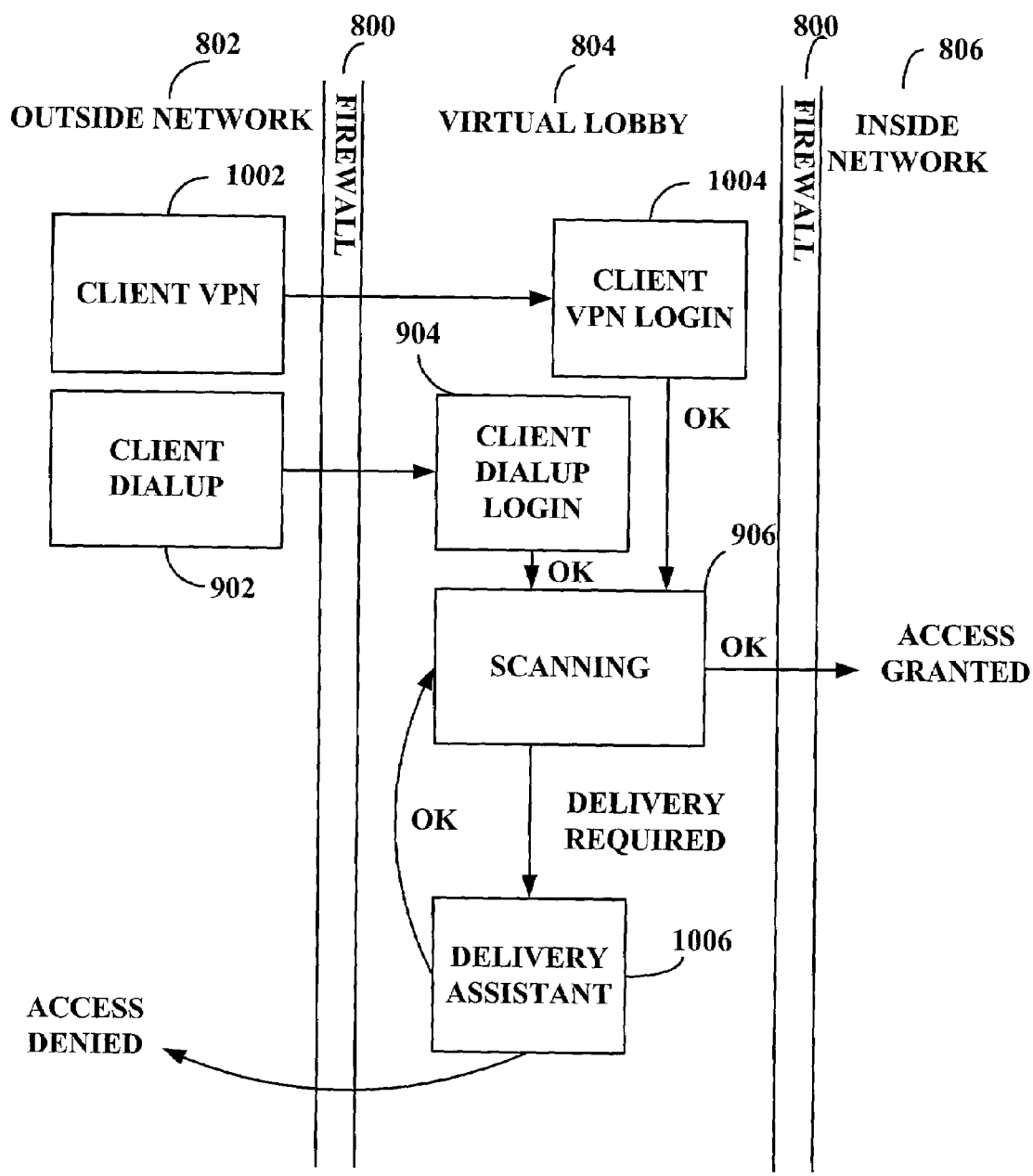
FIG. 10 is a block diagram of another use case in addition to FIGS. 8 and 9 of the present invention as a method for on-connect security scan and delivery.

FIG. 10 is a block diagram of another use case in addition to FIGS. 8 and 9 of the present invention as a method for on-connect security scan and delivery. Similar to the dialup shown in FIG. 9, a client VPN 1002 connects to the virtual lobby 804 through a VPN connection login 1004 in FIG. 10.

In one embodiment, the method for on-connect security scan and delivery comprises controlling configuration of a plurality of security mechanisms for a client based on security requirements for a network. The client is scanned 906 for an indication of whether the client complies with the security requirements. A delivery assistant 1006 is a kind of delivery component and is provided to the client to install and configure at least one of the plurality of security mechanisms. Connection is provided to the client only if the client complies with the security requirements. In another embodiment, third-party security mechanisms that meet the security requirements are certified. The certified third-party security mechanisms are distributed to the client through the delivery assistant 1006. In another embodiment, client information, delivery information, and security requirements are stored in a repository. In another embodiment, an optional delivery is provided to the client. In another embodiment, scanning 906 and delivery components 1006 are provided by vendors and controlled at a meta-level. These components are integrated into a structure or framework and organized or managed.

In another embodiment, a security warning is presented to the client. For example, some security requirements are mandatory and others are suggestions for a higher level of security than a minimum level. Suppose security mechanism A must be installed to comply with the security requirements, but security mechanism B is not a security requirement until the end of next month, so that it is available for installation now or later. In this case, a warning about security mechanism B is presented to the user for the user to decide whether to install now or wait. Another example is security requirements that vary depending on a type of user. For example, a system administrator who needs to perform emergency maintenance on the system should not have to wait for delivery of some kinds of security mechanisms. However, some security requirements are not waived, even for the system administrator, who is capable of causing harm, such as spreading a virus. Another example is a repairman in the factory who needs to get in and fix a problem in a matter of minutes at a time when it costs $100,000 a minute for the factory to be down. In this case, the repairman is exempt from all or select security requirements. In another embodiment, a future delivery is scheduled for the client.

Figure 11:
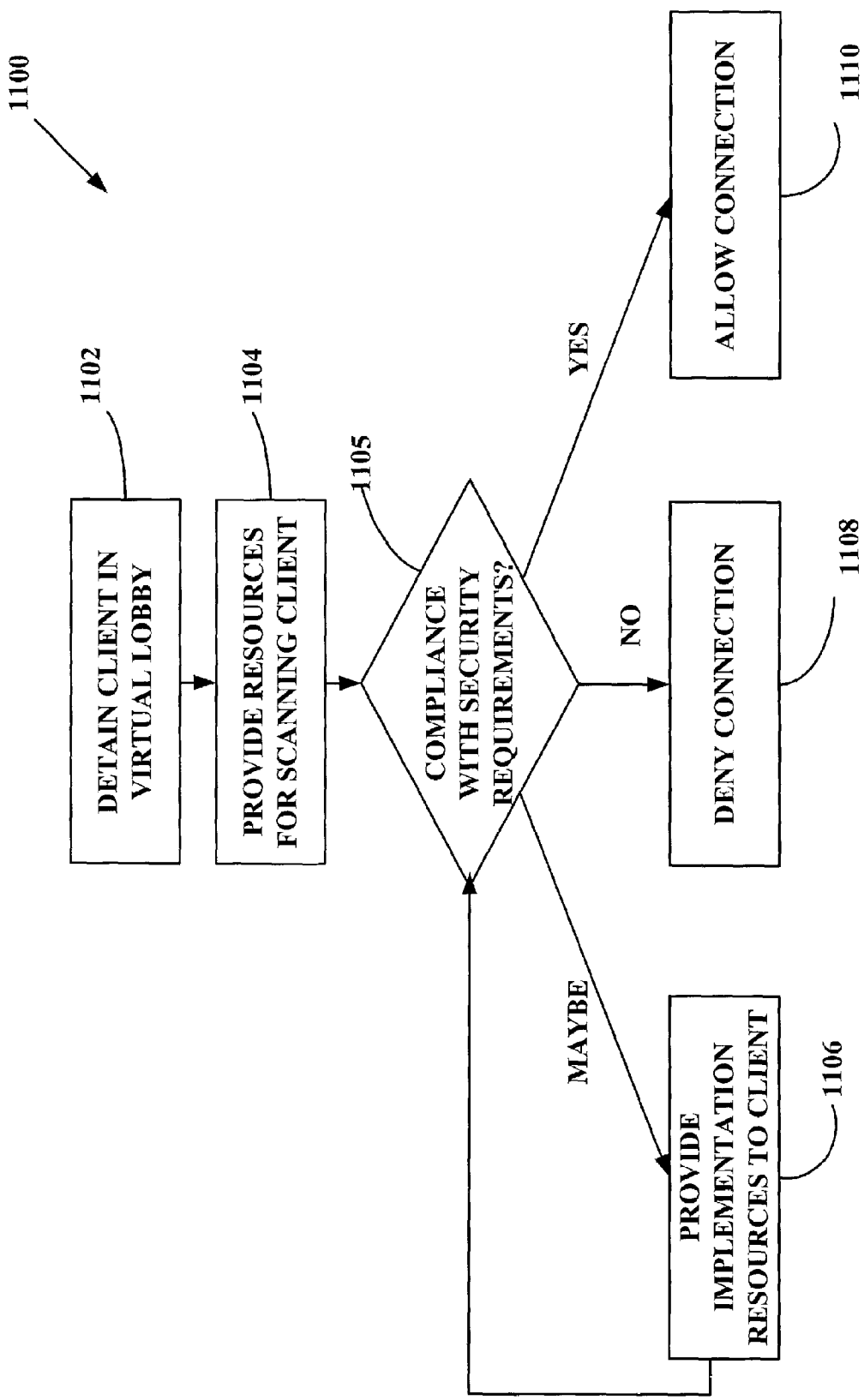
FIG. 11 is a flow chart of an embodiment of the present invention as instructions to operate a network security authority.

FIG. 11 is a flow chart of an embodiment of the present invention as instructions to operate a network security authority 1100. In another embodiment, an article of manufacture has instructions stored on it that cause a computing system to operate as a network security authority 1100. The instructions comprise detaining a client that is attempting to connect to a network in a virtual lobby 1102. The virtual lobby is between an outer firewall and an inner firewall. The inner firewall is between the virtual lobby and the network. Resources are provided for scanning the client to verify the client complies with security requirements 1104. The network security authority determines if the client complies with security requirements 1105. Implementation resources are provided to help the client to comply with security requirements 1105. Permission for the client to connect is denied 1108 to the network upon determining that the client does not comply with security requirements and that the implementation resources to bring the client into compliance are not available. Permission for the client to connect is granted 1110 upon determining 1105 that the client complies with security requirements.

In another embodiment, warnings are provided for select security requirements and the client is permitted to connect to the network. Rules are enforced for overriding the select security requirements. The rules for overriding are adaptably defined under the circumstances. In another embodiment, later operations are scheduled to bring the client into compliance for select security requirements. In another embodiment, a presentation is provided to notify the client of scanning. In another embodiment, a presentation of implementation resources information is provided to the client. In another embodiment, a presentation of a compliance status is provided to the client.

Figure 12:
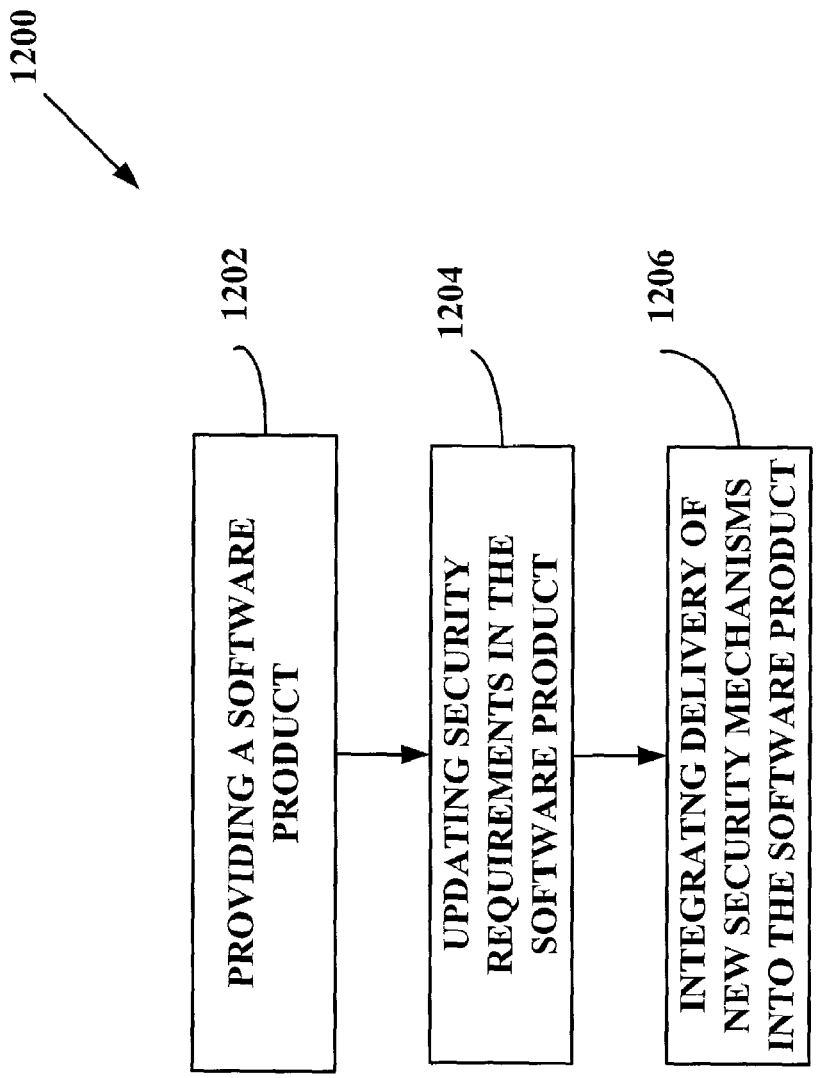
FIG. 12 is a flow chart of an embodiment of the present invention as a method of doing business.

FIG. 12 is a flow chart of an embodiment of the present invention as a method of doing business 1200. In this embodiment, a software product is provided to an enterprise for scanning clients that attempt to connect to a network 1202. The software product also provides delivery of security mechanisms to comply with security requirements. Security requirements are updated in the software product 1204. When the security requirements are updated, delivery of new security mechanisms are integrated into the software product 1206.

Controlling a number of other security products and aiding other companies in sales of their products gives the owner of the present invention a lot of business leverage. Embodiments of the present invention enforce compliance with security policies and automatically deliver security products to ensure compliance for each connecting client. As a result, the network is more secure and less susceptible to threats, such as denial of service attacks. This is a selling feature. Also, the operation of embodiments of the present invention reduces distribution costs for vendors and increase demand for their security products. Vendors will want their products integrated into embodiments of the present invention in order to reach potential buyers, capture market share, and exclude their competition. Also, embodiments of the present invention will increase competition as vendors will compete to meet the latest security requirements and to be certified to be included in the system.

In another embodiment, providing delivery of security mechanisms comprises providing webpages for downloading. In another embodiment, the delivery of security mechanisms is semi-automatically integrated into the software product. In another embodiment, a security mechanism is eliminated from the software product when it is no longer needed to comply with the security requirements. In another embodiment, the business method further comprises contracting with a vendor to provide delivery of at least one security mechanism. In another embodiment, an agreement with an anti-virus program provider structures a deal including a large block of licenses and client usage is audited. In another embodiment, the business method further comprises tracking revenue generated from deliveries to the client over time and delivering at least a percentage of the revenue to the enterprise. In another embodiment, the business method further comprises tracking revenue generated from deliveries by the vendor over time and delivering at least a percentage of the revenue to the enterprise. In another embodiment, the at least one security mechanism is an anti-virus software product.

It is to be understood that the above description it is intended to be illustrative, and not restrictive. Many other embodiments are possible and some will be apparent to those skilled in the art, upon reviewing the above description. For example, other embodiments include a plurality of virtual lobbies protecting a plurality of networks, a plurality of firewalls in communication with a plurality of virtual lobbies, virtual lobbies protecting sub-networks and multiple networks and more. Some other embodiments include any type of computing systems, operating systems, storage devices, networking facilities, and other accessories, and peripherals. Examples of computing systems include servers, workstations, personal computers (PCs), handheld devices, and all other kinds of computing systems. Various embodiments comprise all different kinds of networks, such as local area networks (LANs), wide area networks (WANs), home area networks (HANs), wired and wireless networks, and all other kinds of networks. Therefore, the spirit and scope of the appended claims should not be limited to the above description. The scope of the invention should be determined with reference to the appended claims, along with the full scope of equivalents to which such claims are entitled.

What is claimed is:

1. A method for on-connect security scan and delivery, comprising:
   interfacing with a remote access infrastructure to detain a client in a virtual lobby when the client attempts to connect to a network;
   performing a security risk assessment for the network;
   scanning the client to determine if the client complies with security requirements;
   creating the security requirements to address risks identified in the security risk assessment; and
   permitting connection to the network only if the client complies with the security requirements.

2. The method as recited in claim 1, further comprising:
   interfacing with at least one provider of at least one security mechanism to bring the client into compliance with the security requirements, if the client is not in compliance.

3. The method as recited in claim 1, further comprising:
   retrieving client information from a repository.

4. The method as recited in claim 1, further comprising:
   storing the security requirements in a repository.

5. The method as recited in claim 1, further comprising:
   updating the security requirements with a new policy; and
   interfacing with at least one provider to provide delivery of at least one security mechanism to at least partly implement the new policy.

6. The method as recited in claim 6, further comprising:
   certifying the at least one provider.

7. The method as recited in claim 6, further comprising:
   storing the new policy in a repository.

8. The method as recited in claim 6, further comprising:
   providing a custom configuration tool to at least partly implement the new policy.

9. A method for on-connect security scan and delivery, comprising:
   controlling configuration of a plurality of security mechanisms for a client based on security requirements for a network;
   scanning the client for an indication of whether the client complies with the security requirements;
   providing a delivery assistant to the client to install and configure at least one of the plurality of security mechanisms;
   permitting connection to the client, only if the client complies with the security requirements; and
   providing an optional delivery to the client.

10. The method as recited in claim 9, further comprising:
    certifying third-party security mechanisms that meet the security requirements; and
    distributing the certified third-party security mechanisms to the client through the delivery assistant.

11. The method as recited in claim 9, further comprising:
    storing client information, delivery information, and security requirements in a repository.

12. A method for on-connect security scan and delivery, comprising:
    controlling configuration of a plurality of security mechanisms for a client based on security requirements for a network;
    scanning the client for an indication of whether the client complies with the security requirements;
    providing a delivery assistant to the client to install and configure at least one of the plurality of security mechanisms;
    permitting connection to the client, only if the client complies with the security requirements; and
    presenting a security warning for the client.

13. The method as recited in claim 12, further comprising:
    scheduling a future delivery for the client.

14. A network security authority system, comprising:
    a virtual lobby computing system in communication with two firewalls to protect a network from insecure clients attempting to connect to the network;
    a scanning component operable an the computing system to determine if a client complies with security requirements and to determine if lacking security mechanisms are available for delivery;
    a delivery component operable on the computing system to deliver available security mechanisms to the client; and
    a repository component in communication with the computing system to store the security requirements, wherein the repository component is a database management system that operates to manage the security requirements and associated delivery instructions for available security mechanisms.

15. The network security authority system as recited in claim 14, further comprising:
    a certification system in communication with the computing system to certify third-party security mechanisms that meet the security requirements.

16. The network security authority system as recited in claim 14, further comprising:
    a repository component in communication with the computing system to store the security requirements.

17. The network security authority system as recited in claim 16, wherein the repository component is a database management system.

18. An article of manufacture having instructions stored on it that cause a computing system to operate as a network security authority, the instructions comprising:
- detaining a client that is attempting to connect to a network in a virtual lobby, the virtual lobby being between an outer firewall and an inner firewall, the inner firewall being between the virtual lobby and the network;
- providing resources for scanning the client to verify the client compiles with security requirements;
- providing implementation resources to help the client to comply with security requirements;
- denying permission for the client to connect to the network upon determining that the client does not comply with security requirements and that the implementation resources to bring the client into compliance are not available; and
- scheduling later operations to bring the client into compliance for select security requirements.

19. The instructions as recited in claim 18, further comprising:
- providing warnings for select security requirements and permitting the client to connect to the network; and
- enforcing rules for overriding the select security requirements;
- wherein the rules for overriding are adaptably defined under the circumstances.

20. The instructions as recited in claim 18, further comprising:
- providing a presentation notifying the client of scanning.

21. The instructions as recited in claim 18, further comprising:
- providing a presentation of implementation resources information to the client.

22. The instructions as recited in claim 18, further comprising:
- providing a presentation of a compliance status to the client.

* * * * *

UNITED STATES PATENT AND TRADEMARK OFFICE
CERTIFICATE OF CORRECTION

PATENT NO. : 7,058,970 B2  
APPLICATION NO. : 10/085147  
DATED : June 6, 2006  
INVENTOR(S) : Shaw Page 1 of 1

It is certified that error appears in the above-identified patent and that said Letters Patent is hereby corrected as shown below:

In column 4, at line 41, delete "farther" insert --further--.

In column 10, at line 44, delete "an" insert --on--.

Signed and Sealed this

Twenty-seventh Day of March, 2007

JON W. DUDAS  
*Director of the United States Patent and Trademark Office*